Feb. 17, 1953  F. D. ROHMER  2,628,647
FRUIT AND VEGETABLE REAMING AND JUICING DEVICE
Filed Jan. 21, 1949
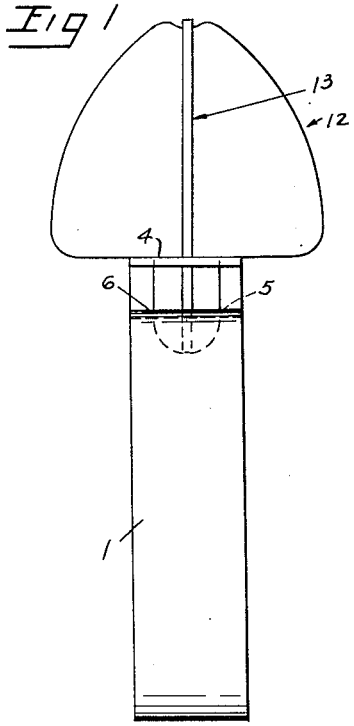
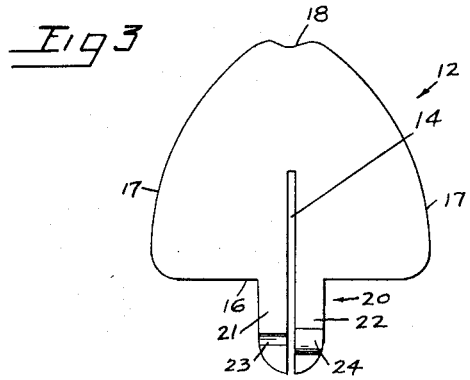
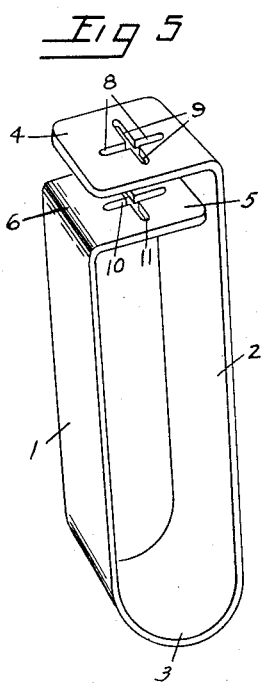
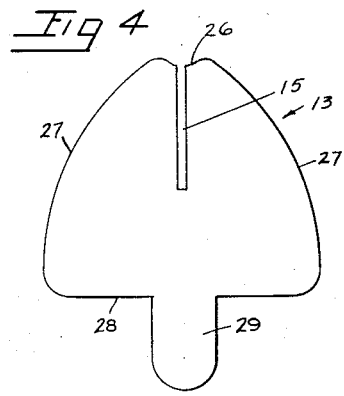
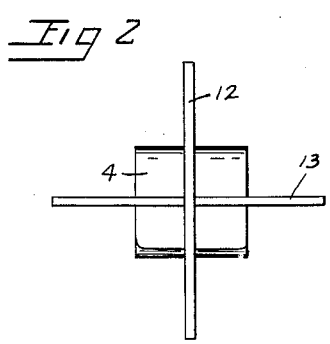
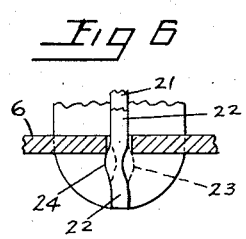
INVENTOR.
FRANK D. ROHMER
BY
Boyken, Mohler + Beckley
ATTORNEYS.

Patented Feb. 17, 1953

2,628,647

UNITED STATES PATENT OFFICE 2,628,647

FRUIT AND VEGETABLE REAMING AND JUICING DEVICE

Frank D. Rohmer, San Francisco, Calif.

Application January 21, 1949, Serial No. 71,963

10 Claims. (Cl. 146—3)

This invention relates to a fruit and vegetable reaming and juicing device, and has for several of its objects the provision of a simple, economically made, rugged device for the purpose of reaming or juicing fruit or vegetables, and which device is so constructed as to be easily and quickly cleaned.

Another object of the invention is the provision of a vegetable reaming and juicing device that is easily and quickly assembled and disassembled for cleaning and which device is made entirely of non-porous material, such as metal, that is practically indestructible, and will not absorb moisture nor objectionable odors.

A still further object of the invention is the provision of a vegetable reaming and juicing device that includes blades formed to accurately and easily ream out fruit in orange, lemon or grapefruit halves, and that is self-centering in such fruit so as to enable the operator to obtain clean hemispherical shells of skin or rind of uniform thickness.

An additional object is the provision of a fruit and vegetable reaming and juicing device that comprises only three units, each readily stamped, cut or formed from sheet metal, and which device is easily and quickly assembled and disassembled, and which device consists of a handle and two blades, at least one of the blades being provided with means integral therewith for holding the assembly together.

Heretofore, most fruit extractors or juice extractors of the type that extract the fruit pulp and juice from fruit by a reaming action, employ an integrally united, more or less dome or conical shaped head, having curved ribs extending generally radially from the apex of the head. United States Letters Patents to Strang, No. 344,506 of June 29, 1886, and to Cummings, No. 2,291,028 of July 28, 1942, are examples of this type of head. In such structure, particles of fruit becoming lodged between adjacent ribs must be picked out or brushed out. It is not possible to disassemble the blades so as to facilitate cleaning.

In those instances where fruit and vegetable reaming and juicing devices have included separable blades, it has been customary to employ a special chuck for the blades, and which chuck, in turn, is detachable from a power driven shaft or manually graspable handle, and either a set screw or separate spring catch has been used to hold the blades in the chuck or to hold the chuck to the shaft or handle, all of which structure adds to the cost of the device and increases the difficulty in cleaning them. Also springs, screws, etc., become broken or lost and have generally been looked upon with disfavor by the user as well as the distributors and manufacturers.

It is an object of this invention to provide a structure that overcomes all of the above objections, as well as others, as will be apparent from the description and drawings.

In the drawings,

Fig. 1 is a side elevational view of the device hereinafter described.

Fig. 2 is a top plan view of the device of Fig. 1.

Fig. 3 is a side elevational view of one of the two blades of the device.

Fig. 4 is a side elevational view of the other blade of the device.

Fig. 5 is a perspective view of the handle alone.

Fig. 6 is an enlarged fragmentary sectional side view showing the extension on the blade of Fig. 3 in yieldable and frictional engagement with the sides of the opening in the upper end of the handle that is shown in Fig. 5.

In detail, the handle of the invention, as herein illustrated, comprises a strip of relatively heavy gauge metal that is doubled back on itself at a point intermediate its ends providing spaced, opposed, elongated legs 2 that are connected at the bend by end piece 3 that is integral with the strip.

The said end piece 3 is curved to fit the palm of the hand of a person when the handle is held by said hand in reaming position in which the forefinger of such hand will usually be alongside the outer surface of leg 1 at the end thereof opposite end piece 3, as will later be explained more in detail.

The leg 2 is longer than leg 1 and the end portion 4 thereof that is opposite end piece 3 is bent at right angle to the leg 2 to project to the side thereof that is adjacent leg 1. End portion 4, in length, is substantially equal to the distance between the opposed surfaces of legs 1, 2.

The end portion 5 of leg 1 that is opposite end piece 3 is bent at right angles to leg 1 to project toward leg 2, and the outer edge of portion 5 will be substantially in engagement with leg 2. By this structure, end portions 4, 5 will extend across the longitudinal axis of the handle with portion 4 overlying portion 5 in spaced relation thereto. The distance between portions 4, 5 is preferably about three-eighths of an inch, whereby the point 6 (Figs. 1, 5) where the bend occurs between leg 1 and end portion 5 will be spaced from end portion 4 a sufficient distance to provide a convenient support for the end of the forefinger of the hand holding the device. This is important for the reason that reaming or cutting blades are outward of the end portion 4 and would preclude any support for the finger at the outer end of leg 2.

The overlying, spaced end portions 4, 5 are each formed with an opening in the form of a right angle cross, thus providing slots 8, 9 extending at right angles to each other in right angle, centrally intersecting relationship in end portion 4 and similarly formed and arranged slots 10, 11 in end portion 5.

The openings formed in end portions 4, 5 are in axially aligned relationship coaxial with the handle.

The reaming or cutting blades shown herein are two in number, being generally designated 12, 13 (Figs. 1, 3, 4).

The blades are preferably of identical contour in outline, except axially extending slot 14 in blade 12 that extends from the inner or lower end of the blade 12 to a point about midway between the upper and lower ends of said blade, and slot 15 formed in blade 13 that extends from the upper and outer end of the blade to a point about midway between the upper and lower ends of said blade.

The slots 14, 15 provide means for assembling the blades in two planes intersecting each other at right angles into the opposite upper and lower ends of the blades even with each other. The line of intersection bisects the blades, said line being in longitudinal alignment with the longitudinal axis of the handle, and said line also extends longitudinally of slots 14, 15 centrally between the opposite sides of each slot.

The outline of blade 12 is symmetrical at opposite sides of slot 14 and a line in extension thereof. This outline may be said to be generally conical or triangular, in the form shown in the drawing, in so far as the main body of the blade is concerned, with the base edge 16 extending perpendicular to slot 14 and with the identical side edges 17 extending convergently toward each other and substantially to a point, or what would be a point were it not for a small axially outwardly opening recess 18 at the adjacent ends of edges 17. The edge of recess 18 is concave, and the edges 17 are convexly curved in their linear dimension, but square transversely thereof so that each edge virtually provides two cutting edges upon oscillation of the blade about its longitudinal axis, and on which axis slot 14 is aligned.

The junctures between base edge 16 and side edges 17 are preferably rounded.

Centrally between the ends of base edge 16 is an axial extension 20 which slot 14 bisects. By reason of slot 14, this extension 20 has two corresponding legs 21, 22. At a point intermediate the ends of one leg 22 the same is bent laterally outwardly to form a slight lateral projection 23, and at a corresponding point on leg 21 the latter is bent laterally outwardly, but in a direction opposite to projection 23 to form a projection 24 (Figs. 3, 6).

The blade 13 is identical with blade 12 except that slot 15 in blade 13 extends from the point of the blade where recess 26 (which corresponds in size and position with recess 18) extends from opposite sides of the slot to the adjacent and convergent ends of the side edges 27. Edges 27 are identical with edges 17.

The base edge 28 of blade 13 is identical with base edge 16 of blade 12, and extension 29 on blade 13 is identical with extension 20 except that it is unslotted and is flat.

When the blades 12, 13 are assembled in centrally intersecting relationship, as shown in Figs. 1, 2, the extensions 20, 29 form a cross in cross-sectional contour, which extensions are adapted to slip longitudinally thereof through the cross like openings formed in end portions 4, 5 by intersecting slots 8, 9 and 10, 11. However, the projections 23, 24 will cause the legs 21, 22 to spring oppositely in passing through the slots, and when they pass through slot 10, for instance, in the end portion 5, they will tend to spring back so that the legs will be coplanar, and the distance between the base edges 16, 28 and the projections 23, 24 is such that when these edges contact the end portion 4, the legs 21, 22 will only be partially returned to normal coplanar position, and the upper sides of said projections will be in yieldable engagement with the opposite sides of slot 10, thereby yieldably holding the blades tightly in the handle so the blades will not rattle, and will require an outward pressure on said extensions to free the blades from the handle. Inasmuch as the normal reaming action is against the outer or cutting edges of the blades, they cannot become accidentally released during a reaming operation, nor can they be accidentally pulled from the holder. By pressing against the extensions 20, 29 in an outward direction, the blades will easily be released from the handle.

If, after long and repeated use, the projections should tend to become worn in a manner that might give undesirable looseness to the blades, the tension can be restored by merely bending the legs oppositely laterally to again move the projections out to positions tightly engaging opposite sides of the slot 10.

The exact curvature of the edges 12, 13 is not necessarily that described. The curvature depends to some extent upon the type of recess desired and the fruit or vegetable being processed. In some instances, as in my co-pending application, Serial No. 734,942, filed March 15, 1947, the contour of the cutting edges may be hemispherical, or substantially so.

When the blades are separated from the handle and from each other there are no crevises, recesses, or cracks where food or juice may become lodged. None of the parts are porous, hence they cannot become impregnated with food odors.

The term "juicing" as used, does not necessarily mean that the juice will be extracted by the device without separation of the pulp, but the pulp will be cut and the cells broken so as to free the juice for separation from the pulp.

The recesses 18, 26 constitute an automatic centering means for the reamer when used with fruits, such as oranges, grapefruit, or lemons, that may have a central stem of pith or other fibrous growth, that would otherwise tend to deflect the reamer. As it is, this central growth is held within the recess and becomes a center guide for the device.

An important function which this invention serves is to provide a simple, inexpensive device for preparing quickly and easily vegetables and fruits for stuffing and baking or for salads or for obtaining juices and fine pulp, such as from onions, for enhancing the tastes of meats, gravies and salads. An additional purpose served is that onions may be juiced and the disagreeable "tearing" avoided. This is accomplished by "topping" the onion near the stem or leaf end and peeling after juicing. This reamer when used on all globe type vegetables or fruits serves many culinary purposes, such as hollowing apples for making fruit basket salads, hollowing red beets for making attractive vegetable basket salads, for hollowing potatoes, raw or cooked in preparing baked stuffed potatoes. These are but a few of the uses which this invention anticipates in extending the use of common foods into newer attractive appetizing dishes.

As already stated, the shoulder or point 6 constitutes a rest for the forefinger of the operator spaced from the blades. The spacing of the end portions 4, 5 gives a very sturdy and solid brace and support for the blades, and at the same time, objectionable closed-end recesses for the blades are eliminated. No food can collect in the crosslike openings, but will be flushed directly therethrough by a simple rinse when the blades are removed.

I claim:

1. A fruit and vegetable reaming and juicing device comprising a pair of flat blades arranged in intersecting planes along a line bisecting each of the blades, extensions integral with said blades along said line extending longitudinally of the latter, an elongated handle formed with an opening at one end that is coaxial with the longitudinal axis of said handle for releasably receiving said extensions and for holding said blades together, two of said extensions being resilient and being formed with oppositely outwardly extending projections in frictional and yieldable engagement with opposite sides of said opening for yieldably securing said blades to said handle, said blades being complementarily slotted from opposite edges along said line with the unslotted remainders of each blade along said line within the slot of the other blade for securing said blades together in interlocking relationship with the said unslotted remainder on one blade being between the unslotted remainder of the other blade and the end of said handle, said resilient extensions being on said other blade whereby both of said blades will be held on said handle by said other blade when said resilient extensions are in said opening.

2. A fruit and vegetable reaming and juicing device comprising a pair of flat blades arranged on intersecting planes along a line bisecting each of the blades, an elongated handle, means for removably securing said blades to one end of said handle and in releasable interlocking relationship on said handle with said handle coaxial with said line, each of said blades outwardly of said handle being symmetrical at opposite sides of said line and of corresponding outline in which each is formed with a relatively wide base edge extending perpendicular to said line at the end of said handle and convergently extending convexly curved edges extending from the ends of said base edge away from said handle toward a point on said line with the edges of each blade at said point extending reentrantly into each blade to provide outwardly opening recesses in said blades on said line at their apices for engagement of the edges of the blades along said recesses with a fruit or vegetable when said blades are secured on said handle 3. A fruit and vegetable reaming and juicing device comprising a pair of flat blades arranged on intersecting planes along a line bisecting each of the blades, an elongated handle, means for removably securing said blades to one end of said handle and in releasable interlocking relationship on said handle with said handle coaxial with said line, each of said blades outwardly of said handle being symmetrical at opposite sides of said line and of corresponding outline in which each is formed with a relatively wide base edge extending perpendicular to said line at the end of said handle and convergently extending convexly curved edges extending from the ends of said base edge away from said handle toward a point on said line with the edges of each blade at said point extending concavely inwardly into each blade to provide outwardly opening correspondingly shaped recesses in said blades on said line at their apices for engagement of the edges of the blades along said recesses with a fruit or vegetable when said blades are secured on said handle.

4. A fruit and vegetable reaming device comprising a pair of flat blades arranged in intersecting planes along a line bisecting each of the blades, an extension integral and coplanar with each blade along said line, the extensions on said respective blades also being in intersecting planes and defining the outline of a cross in cross-sectional contour perpendicular to said line, a handle formed from a strip of metal bent on itself to form a pair of opposed spaced legs and an end piece connecting said legs at one of their ends, the end portions of said legs at their opposite ends being bent inwardly toward each other to opposed overlying relationship extending across the longitudinal axis of said handle, said end portions being apertured to receive the extensions on said blades.

5. A fruit and vegetable reaming device comprising a pair of flat blades arranged in intersecting planes along a line bisecting each of the blades, an extension integral and coplanar with each blade along said line, the extensions on said respective blades also being in intersecting planes and defining the outline of a cross in cross-sectional contour perpendicular to said line, a handle formed from a strip of metal bent on itself to form a pair of opposed spaced legs and an end piece connecting said legs at one of their ends, the end portions of said legs at their opposite ends being bent inwardly toward each other to opposed overlying relationship extending across the longitudinal axis of said handle, said end portions being apertured to receive the extensions on said blades, and said end piece being curved to fit in the palm of the hand of an operator when said handle is held in operating position in said hand.

6. A fruit and vegetable reaming device comprising a pair of flat blades arranged in intersecting planes along a line bisecting each of the blades, an extension integral and coplanar with each blade along said line, the extensions on said respective blades also being in intersecting planes and defining the outline of a cross in cross-sectional contour perpendicular to said line, a handle formed from a strip of metal bent on itself to form a pair of opposed spaced legs and an end piece connecting said legs at one of their ends, the end portions of said legs at their opposite ends being bent inwardly toward each other to opposed overlying relationship extending across the longitudinal axis of said handle, said end portions being apertured to receive the extensions on said blades, the apertures in said end portions each having the same shape as the said cross-sectional outline of said extensions.

7. A fruit and vegetable reaming device comprising a pair of flat blades arranged in intersecting planes along a line bisecting each of the blades, an extension integral and coplanar with each blade along said line, the extensions on said respective blades also being in intersecting planes and defining the outline of a cross in cross-sectional contour perpendicular to said line, a handle formed from a strip of metal bent on itself to form a pair of opposed spaced legs and an end piece connecting said legs at one of their ends, the end portions of said legs at their opposite ends being bent inwardly toward each other to opposed overlying relationship extending across the longitudinal axis of said handle, said end portions being apertured to receive the extensions on said blades, said end portions being spaced apart and the apertures therein being in alignment and being substantially the same shape as the said cross-sectional outline of said extensions, one of said extensions being divided into two sections extending longitudinally of said line and at opposite sides thereof, said sections being resilient and being in yieldable engagement with opposite sides of the aperture in the end portion of said strip that is most remote from said blades.

8. A fruit and vegetable reaming device comprising a pair of flat blades arranged in intersecting planes along a line bisecting each of the blades, an extension integral and coplanar with each blade along said line, the extensions on said respective blades also being in intersecting planes and defining the outline of a cross in cross-sectional contour perpendicular to said line, a handle formed from a strip of metal bent on itself to form a pair of opposed spaced legs and an end piece connecting said legs at one of their ends, the end portions of said legs at their opposite ends being bent inwardly toward each other to opposed overlying relationship extending across the longitudinal axis of said handle, said end portions being apertured to receive the extensions on said blades, said end portions being spaced apart and the apertures therein being in alignment and being substantially the same shape as the said cross-sectional outline of said extensions, one of said extensions being divided into two sections extending longitudinally of said line and at opposite sides thereof, said sections being resilient and being in yieldable engagement with opposite sides of the aperture in the end portion of said strip that is most remote from said blades, said sections having oppositely outwardly extending projections therein in said yieldable engagement with said sides at the side of said section adjacent said end piece.

9. A fruit and vegetable reaming device comprising a pair of flat blades arranged in intersecting planes along a line bisecting each of said blades, an extension integral and coplanar with each blade along said line, the extensions on said respective blades also being in intersecting planes and defining the outline of a cross in cross-sectional contour perpendicular to said line, an elongated handle in one end of which said extensions are secured, one blade of said pair being in interlocking relationship to the other blade for holding said other blade in assembled relationship thereto on said one end of said handle, and means for securing the extension on said one blade on said one end, said handle including a pair of spaced members integral therewith at said one end and extending across the longitudinal axis of said handle, said members being formed with aligned openings having the same shape as the said cross-sectional contour of said extensions and through which said extensions extend when on said handle.

10. A fruit and vegetable reaming device comprising a pair of flat blades arranged in intersecting planes along a line bisecting each of said blades, an extension integral and coplanar with each blade along said line, the extensions on said respective blades also being in intersecting planes and defining the outline of a cross in cross-sectional contour perpendicular to said line, an elongated handle in one end of which said extensions are secured, one blade of said pair being in interlocking relationship to the other blade for holding said other blade in assembled relationship thereto on said one end of said handle, and means for securing the extension on said one blade on said one end, said handle including a pair of spaced members integral therewith at said one end and extending across the longitudinal axis of said handle, said members being formed with aligned openings having the same shape as the said cross-sectional contour of said extensions and through which said extensions extend when on said handle, the said extension on said one blade being split longitudinally along said line and the portions at opposite sides of said line being in yieldable engagement with the edges of the opening in the member of said pair that is most remote from said blades.

FRANK D. ROHMER.

REFERENCES CITED

The following references are of record in the file of this patent:

UNITED STATES PATENTS

| Number | Name | Date |
|---|---|---|
| 343,754 | Bradley | June 15, 1886 |
| 1,155,229 | Gorton | Sept. 28, 1915 |
| 1,366,610 | Teller | Jan. 25, 1921 |
| 1,699,585 | Earles | Jan. 22, 1929 |
| 2,135,679 | Schwister | Nov. 8, 1938 |
| 2,486,423 | Krieger | Nov. 1, 1949 |